United States Patent [19]
Schröder

[11] 3,790,357
[45] Feb. 5, 1974

[54] METHOD OF PRODUCING CALORIFIC ENERGY

[75] Inventor: Johann Schröder, Aachen, Germany

[73] Assignee: U.S. Philips Corporation, New York, N.Y.

[22] Filed: Jan. 13, 1972

[21] Appl. No.: 217,639

Related U.S. Application Data

[63] Continuation of Ser. No. 861,029, Sept. 25, 1969, abandoned.

[30] Foreign Application Priority Data
Sept. 30, 1968 Netherlands ....................... 6813987

[52] U.S. Cl. .................................... 44/3 R, 149/109
[51] Int. Cl. .............................................. F24j 1/00
[58] Field of Search ...................... 44/3 R, 3 A–3 D; 149/109; 23/89

[56] References Cited
UNITED STATES PATENTS
3,325,318  6/1967  Pauliukonis .......................... 149/109
3,697,239  10/1972  Schroder ............................... 44/3 R

*Primary Examiner*—C. F. Dees
*Attorney, Agent, or Firm*—Frank R. Trifari

[57] ABSTRACT

Calorific energy produced by reacting sulfur hexafluoride with an alloy of lithium and calcium in a ratio such that an eutectic mixture of the resultant fluorides are formed.

3 Claims, 1 Drawing Figure

PATENTED FEB 5 1974　　　　　　　　　　　　　　3,790,357
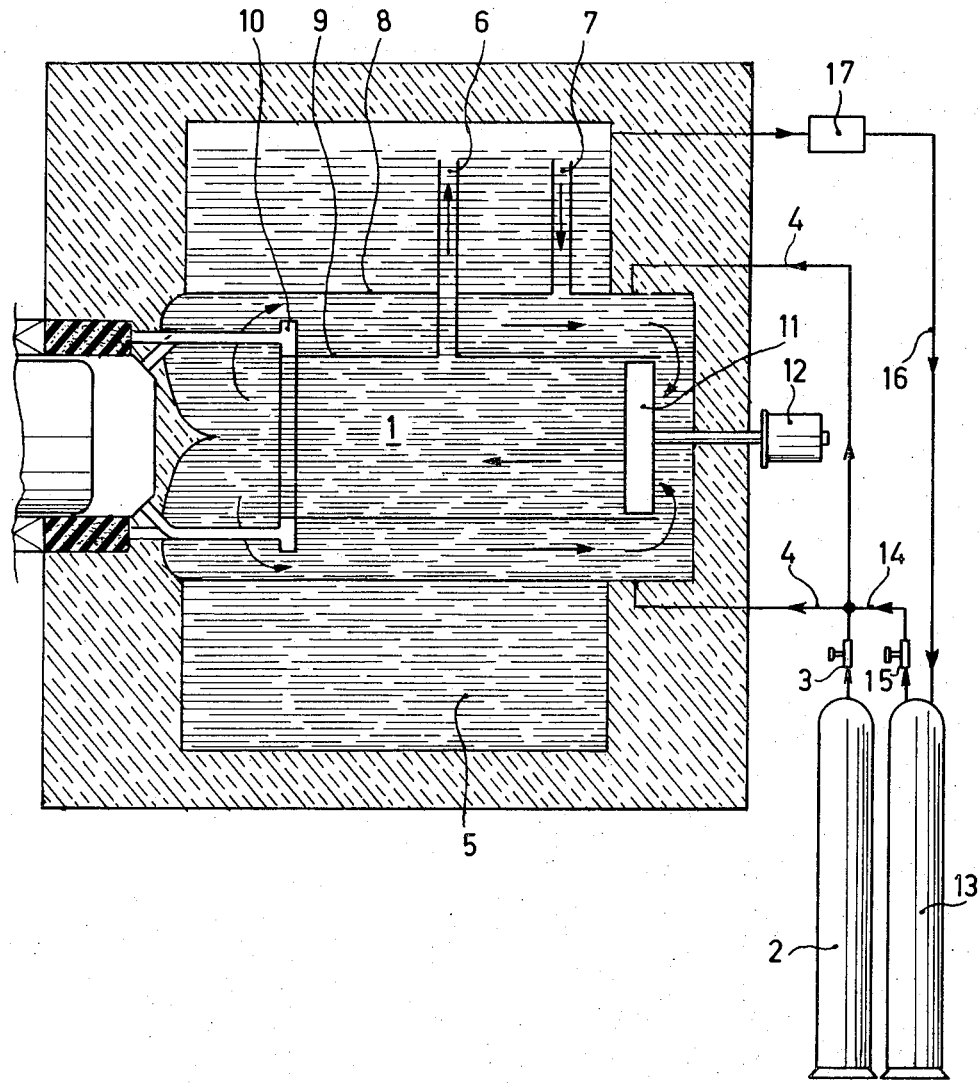
INVENTOR.
JOHANN SCHRÖDER
BY
AGENT

METHOD OF PRODUCING CALORIFIC ENERGY

This is a continuation of application Ser. No. 861,029, filed Sept. 25, 1969, now abandoned.

The invention relates to a method of producing calorific energy by reacting sulphur hexafluoride with a lithium and calcium containing alloy in a chemical reactor.

Such a method is known from U.S. Pat. No. 3,325,318. According to this Patent Specification an alloy suitable for this purpose contains at least 50 percent by weight of lithium, remainder aluminium, and/or up to 25 percent by weight of a metal from the group formed by sodium, potassium, beryllium, magnesium and calcium.

The conversion is performed under circumstances such that a solid reaction product containing lithium sulphide (melting point approximately 950° C) and lithium fluoride (melting point 848° C) is formed.

According to this Patent Specification heat can be extracted from the reactor by means of a working fluid flowing through tubes which are embedded in the stationary bed consisting of mainly lithium and solid reaction products of lithium and sulphur hexafluoride. A uniform reaction process and an effective extraction of the reaction heat in the presence of solid reaction products are, however, only extremely difficult to realize.

An object of the invention is to provide a method of this nature, the reactor containing a liquid lithium alloy whose reaction products with $SF_6$ at operating temperature (800° C) are also largely liquid and are immiscible or substantially immiscible with the lithium alloy, the volume of the reacting mass remaining constant during the reaction or being variable between narrow limits.

According to the invention these objects are achieved by means of a method which is characterized in that in a reactor melt of an alloy containing lithium and calcium in a ratio such that the mixture of lithium fluoride and calcium fluoride formed during the reaction with sulphur hexafluoride has a eutectic composition, is converted with sulphur hexafluoride at a temperature at which the eutectic mixture of fluorides formed during the reaction will be melted.

Lithium fluoride and calcium fluoride form a eutectic mixture in a ratio of 4 : 1 in gram atoms. The eutectic melting point is 769° C. A great part of the sulphides formed during the reaction dissolve in the eutectic mixture of the fluorides. It is found that at temperatures between approximately 800° and 900° C the specific volume of this molten mixture corresponds to the specific volume of the starting alloy. As compared with all other elements and feasible combinations of elements, the combination of lithium and calcium in the ratio of 4 : 1 yields the largest amount of energy per unit volume in case of conversion with $SF_6$ at 850° C.

The method according to the invention provides the advantage that calorific energy can be produced in a temperature range between 800° and 900° C. This temperature range may be extended between 700° and 900° C by means of steps to be further described hereinafter.

The said temperature range between 700° and 900° C is particularly suitable for applying calorific energy to engines in which a working medium flows through a thermodynamic circuit between an expansion space at a high temperature and a compression space at a low temperature. An Example of such an engine is a hot gas engine. Heat can then be applied to the engine by establishing contact between the liquid mass in the chemical reactor and the hot gas engine heater usually consisting of a system of conduits through which the working medium flows on its path to and from the expansion space. A great efficiency in case of small dimensions of the heater is obtained if the calorific energy is available at approximately 800° C. In connection with the properties of the structural materials currently known, temperatures of more than 900° C are less desirable for this purpose.

If desired the heat may alternatively be transferred with the aid of a heat transporting medium, for example, a liquid Na-K alloy which circulates in a system which is in heat-exchanging contact with the chemical reactor as well as with the heater of the hot gas engine.

When using the method according to the invention salts formed during the reaction are prevented from being deposited on those areas where heat is released by the mass reacting in the reactor. Such a deposition which occurs if heat is released at a temperature below the melting point of the mixture of reaction products would impede the transfer of heat between the reacting mass and the system to which heat must be transferred. In a stationary bed consisting of a reacting mass and solid reaction products the reaction between the reacting mass and the sulphur hexafluoride is difficult to control or cannot be controlled, and owing to the formation of solid salts the reaction is slowed down more and more as the reaction proceeds. In the method according to the invention, local overheating in the chemical reactor can be avoided, while heat can be released in a uniform and a controlled manner, particularly when the liquid content of the reactor circulates as will further be described hereinafter.

The salts formed in the method according to the invention and the metals lithium and calcium are mutually soluble to a slight extent only. Consequently, the possibility is created of separating the liquid salts from the metal alloy, for example, by circulating the reacting mass between the actual reactor space and a sedimentation space which may also serve as a spare container, the flow speed in the sedimentation space being made to be slower than the flow speed in the rest of the system. This embodiment of the method according to the invention provides the advantage that the reaction velocity can be maintained substantially constant at a constant supply of sulphur hexafluoride to the reactor because the concentration of metal in the reactor remains substantially constant over a considerable part of the period required for complete conversion.

Since the specific volume of the mixture of the reaction products formed does not essentially differ from the specific volume of the alloy of lithium and calcium at the atomic ratio of 4 : 1, which surprisingly coincides with the eutectic composition of the fluorides formed, the possibility is provided to have the chemical reactor operate independently of exterior influences.

As already stated, the method is particularly suitable for supplying heat (calorific energy) at temperatures between 800° and 900° C. After the reaction has been finished, the melting heat becomes available when cooling at 769° C.

It may be advantageous to add up to a total of 30 atom percent of sodium and/or magnesium to the lithium-calcium alloy.

The suitable temperature range may be extended, for example, to approximately 700° to 900° C by using an alloy which in addition to lithium and calcium in the atomic ratio of 4 : 1 contains up to 30 atom percent calculated on the ultimate alloy of an alloy containing 73 atom percent of sodium and 27 atom percent of magnesium. Alloys which are chosen within this range also do not essentially change their volume upon conversion with $SF_6$.

The mixture of fluorides formed upon conversion of an alloy consisting of 56 atom percent of lithium
14 atom percent of calcium
21.9 atom percent of sodium
8.1 atom percent of magnesium, with $SF_6$ has completely melted above approximately 650° C.

The quantity per unit volume of released calorific energy of such a sodium and magnesium containing alloy is, however, smaller than that of an alloy containing exclusively lithium and calcium.

An alloy containing lithium and calcium in the atomic ratio of 4 : 1 produces 2.9 kcal at a temperature of 850° C of the melt and at a temperature of 20° C of the $SF_6$ reacting therewith per cm³ of alloy in combination with liquid $SF_6$. This is surprisingly found to be equal to the quantity of calorific energy which can be obtained with lithium only per unit volume under the same circumstances and it is found to be more than can be obtained under the same circumstances with the metals sodium (1.6 kcal). potassium (0.9 kcal), magnesium (2.5 kcal), calcium (2.7 kcal), aluminium (2.2 kcal), and lanthanum (2.2 kcal). The volume of the melt decreases upon reaction between lithium only and $SF_6$.

It is alternatively possible to utilize the melting heat of the eutectic mixture of fluorides at 769° C as a result the quantity of energy per unit volume is increased by approximately 10 percent.

A small increase of volume of the reacting mass may be brought about by adding magnesium to the lithium-calcium alloy, a small decrease can be brought about by adding sodium to the lithium-calcium alloy. Under certain circumstances a small essential increase or decrease of volume, (of a few percents) may be desirable. However, when sodium is present one of the essential advantages of the lithium-calcium alloy, manely the possibility of handling this alloy in air, is substantially lost.

In the foregoing the formation of fluorides is particularly emphasized, but also sulphides are of course formed during the reaction in accordance with:

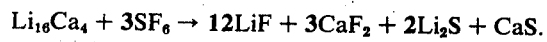

$Li_{16}Ca_4 + 3SF_6 \rightarrow 12LiF + 3CaF_2 + 2Li_2S + CaS$.

It was found in practice, however, that the greater part of the sulphides dissolves in the molten fluorides, and the rest is found to occur finely dispersed in the metal and fluoride melts.

Furthermore it has been found that for obtaining the desired effects it is not necessary for the ratio between lithium and calcium in the alloy to correspond exactly to the ratio between lithium and calcium in the eutectic mixture.

Alloys of the composition 41 percent by weight ± 3 percent by weight of lithium, remainder calcium and the usual impurities, in practice usually a total of less than 1 percent by weight, were found to be suitable too.

The fluorides formed during the reaction with sulphur hexafluoride mainly form a eutectic mixture, a slight excess in, for example, a quantity of a few percent by weight of one of the two fluorides is separated in finely dispersed form, when separation occurs and is generally not essentially disturbing in these small quantities. (Melting point of lithium fluoride is 848° C, of calcium fluoride 1,418° C.).

In order that the invention may be readily carried into effect an embodiment thereof will now be described in detail by way of example, with reference to the accompanying diagrammatic drawing, which comprises only one FIGURE and which is a cross-sectional view of a chemical reactor in which the method according to the invention can be performed in an advantageous manner.

The reactor shown in the FIGURE includes a reaction space 1 which is filled with a mixture of an alloy of lithium and calcium (4 : 1 in gram atoms). The container 2 contains sulphur hexafluoride. The container 2 communicates with the reaction space 1 through a control cock 3 and a number of supply conduits 4, two of which are shown in the FIGURE. The reaction space 1 communicates through the exhaust conduit 6 and the supply conduit 7 with a second space hereinafter referred to as container 5 which is likewise filled with a mixture or an alloy of lithium and calcium in the given ratio and which surrounds the reaction space 1. The reaction space 1 comprises a cylindrical container 8 in which a cylinder 9 is concentrically arranged. Cylinder 9 is open at either end and does not contact the endwalls of the cylindrical container 8. The end of cylinder 9 adjoins the crown of heater tubes 10 of a hot gas engine. An aperture is provided on the other side between the end of the cylinder 9 and the cylindrical container 8. In this manner a circulation duct is obtained in which a pump 11 is placed which is driven by the electric motor 12 shown diagrammatically. The reaction space is in heat exchanging contact with the reserve container 5. The container 13 contains an inert gas, for example, argon and communicates with the conduit 4 through the conduit 14 and the control cock 15. The container 13 communicates with the reserve container 5 through the conduit 16 and the compressor 17.

The operation of the reactor is as follows: Initially the reactor is at a temperature at which the mixture or the alloy of lithium and calcium in the reaction space 1 and the container 5 is solid. The metal mass is melted, for example, by means of electric heating (not shown). Subsequently the pump 11 is activated and a flow is produced in the reaction space as shown therein by means of arrows. Subsequently the control cocks 3 and 15 are opened and a constant flow of sulphur hexafluoride, under its own pressure and mixed with the inert gas is introduced into the reaction space where immediately a reaction takes place in accordance with $Li_{16}Ca_4 + 3 SF_6 \rightarrow 12LiF + 3CaF_2 + 2Li_2S + CaS - 1980$ kcal. (850° C).

The heat released during the reaction is transferred to the heater tubes 10. Part of the reaction products formed and the non-converted alloy of lithium and calcium flows through the cylinder 9 to the left, flows around the heater tubes 10, and subsequently flows to the right through the space between cylinder 9 and the wall of the cylindrical space 8, another part of the reaction products formed including the alloy which is not converted leaves the reaction space through the conduit 6 and comes in the reserved container 5. Since the flow speed in the reserve container is smaller than that in the reaction space 1, the formed reaction products whose specific gravity is approximately twice as large as that of the metal alloy have the opportunity to deposit in this container. The specifically lighter metal alloy flows back into the reaction space through the conduit 7.

The inert gas introduced with $SF_6$ into the reaction space is collected in the reserve container when it is pumped back into the container 13 through the conduit 16 and the compressor 17. This serves to prevent molten alloy and/or reaction products from coming into the conduit 4 upon discontinuation of the $SF_6$ supply.

By passing part of the alloy and reaction products through the reserve container 5 at a small speed and by causing the reaction products to deposit therein, it is achieved that the circumstances of reaction in the reaction space remain substantially constant during a considerable part of the time required for a complete conversion. The concentration of reaction products in the reaction space 1 steadily increases only after so much alloy has been converted that the reserve container 5 is substantially filled with the reaction products, so that the speed of conversion of the alloy with sulphur hexafluoride is reduced. By admitting comparatively more sulphur hexafluoride, the speed of conversion can again be increased. All this may be controlled automatically, for example, by means of a gas cock in conduit 4 which is controlled by a thermostat in such a manner that the temperature in the reaction space remains constant (not shown).

It is evident that a maximum efficiency is obtained with the chemical reactor if the volume of the reacting mass remains constant as much as possible during the reaction.

What is claimed is:

1. A method of producing calorific energy for a heat generator comprising reacting sulfur hexafluoride with an alloy of lithium and calcium in a chemical reactor, at a temperature and with the ratio of lithium and calcium in said alloy being such that the resultant mixture of lithium fluoride and calcium fluoride is mainly an eutectic mixture in the liquid state and wherein the chemical reactor comprises two interconnected spaces and a pump means for transporting liquid between said spaces and wherein sulfur hexafluoride dissolved in a melt of said alloy is introduced into one of said spaces, at least part of the resultant molten mixture of said alloy and said eutectic mixture of fluorides being moved by said pump means from said first space to said second space wherein the molten alloy is separated and then returned to said first space.

2. The method of claim 1 wherein the alloy consists of 41 ± 3 percent by weight of lithium and the remainder calcium with less than about 1 percent by weight of impurities and the reaction temperature is between 800° and 900° C.

3. The method of claim 1 wherein the alloy consists of lithium and calcium in a ratio in gram atoms of 4 to 1 and up to 30 atoms percent of sodium, magnesium or a mixture thereof.

* * * * *